United States Patent [19]

Palladino

[11] Patent Number: 5,458,813
[45] Date of Patent: Oct. 17, 1995

[54] METHOD FOR PREPARING BORON-CONTAINING POROUS GELS

[75] Inventor: Massimo Palladino, Milan, Italy

[73] Assignee: Enichem S.p.A., Milan, Italy

[21] Appl. No.: 95,899

[22] Filed: Jul. 21, 1993

[30] Foreign Application Priority Data

Jul. 28, 1992 [IT] Italy .................................. MI92A1824

[51] Int. Cl.$^6$ ............................ B01J 13/00; B64C 11/00; C03C 3/00
[52] U.S. Cl. .......................... 252/315.01; 264/65; 501/12
[58] Field of Search ............................. 252/302, 315.01; 501/12; 264/65

[56] References Cited

U.S. PATENT DOCUMENTS 5,063,179 11/1991 Menashi et al. ........................ 501/12
5,076,980 12/1991 Nogues et al. ............................ 501/12
5,192,351 3/1993 Mathur et al. ............................ 501/12

FOREIGN PATENT DOCUMENTS 62-83323 9/1987 Japan .
1-141832 9/1989 Japan .
2-258639 1/1991 Japan .

*Primary Examiner*—Shean Wu
*Attorney, Agent, or Firm*—Rogers & Wells

[57] ABSTRACT

Method for introducing boron into dry, porous gels obtained by means of the "sol-gel" technique, consisting of contacting the concerned gel with a boron compound obtained in situ by causing suitable reactants in gas state to react with one another.

1 Claim, No Drawings

METHOD FOR PREPARING BORON-CONTAINING POROUS GELS

FIELD OF THE INVENTION

The present invention relates to a method for preparing dry, porous, boron containing gels intended for use in glass manufacture.

BACKGROUND OF THE INVENTION

More particularly, the present invention relates to the introduction of boron compounds into the porous gels obtained by means of a sol-gel technique. By the expression "sol-gel technique", reference is made in the following of the present disclosure, to a multistep chemical process the purpose of which is obtaining inorganic oxides and which can be schematically described as follows:

(a) formation of a solution (sol), generally in alcohol or water-alcohol mixture, of a suitable precursor of the element the oxide which one wishes to prepare; the precursor is a molecule MXn, wherein M may be any metal and X generally is a halogen or an alcohol radical —OR. Single-component oxides (i.e., oxides containing one single metal species only) can be obtained with trivalent or higher valency metals; univalent or divalent metals can be added in multi-metal oxide compositions;

(b) hydrolysis of the above precursor by means of the addition of controlled water amounts;

(c) polycondensation of the resulting hydrolysis compound; during this step, —OH groups bonded to two different cations react with each other yielding an oxygen bridge between said two cations, with one water molecule being formed;

(d) gelation; during this step, the polycondensation continues, with an inorganic polymer being formed in which the metal cations are linked to each other by oxygen bridges. At the end of the process, a jelly mass (i.e., a "gel") is obtained in which all metal cations are mutually bonded through oxygen bridges; this structure occupies the entire space occupied by the original solution inside the container;

(e) drying; during this step, that portion of the initial solvent is removed which during the gelation step remained entrapped inside the pores of the gel, with a dry, extremely porous solid material being obtained;

(f) sintering or compaction; the dry gel is submitted to a thermal treatment up to a suitable temperature, which substantially depends on chemical gel composition. During this step, the pores get closed and the gel "collapses", i.e., it linearly shrinks down to a size which is approximately a half of the initial size, however retaining its shape, which is the shape of the initial container inside which the solution had been prepared, or had been transferred.

The sol-gel technique potentially offers some advantages as regards the production of glasses, ceramic materials or glass-ceramic materials, over the traditional melting techniques.

First of all, the sol-gel technology makes it possible for the desired products to be obtained at temperatures which may even be one thousand degrees lower than required by the melting techniques.

Another advantage offered by the sol-gel technology in order to obtain the above said materials consists in the higher homogeneity of the end products: in fact, a molten mass constituted by silica and a second component may display a high viscosity, which slackens the mutual diffusion of the species, even at temperatures of the order of 2000° C. On the contrary, in the case of the sol-gel technique, the distribution of the components is homogeneous at an atomic level already from the first steps of the preparation procedure, because the process starts from an aqueous or water-alcoholic solution.

A last advantage offered by the sol-gel technique as compared to the melting technique in order to obtain glasses consists the possibility of obtaining metastable, i.e., kinetically stable, materials; this is because the dried gels undergo the compaction into glass without ever being melted, so the mobility of any present species is never so high as to allow the thermodynamic equilibrium to be established Owing to these reasons, during the last fifteen years many research efforts have been concentrated on sol-gel techniques, aiming at demonstrating what the real possibilities were of exploiting the above said potentialities at a practical level. Most works aimed at reproducing glasses obtained by melting processes, and subsequently comparing the physical-chemical properties of nominally equal glasses, obtained by means of said two different techniques.

Within the scope of this approach, reproducing boron containing glasses is important, because boron is present in a large number of technically or commercially important glasses, such as, "Pyrex" glass. Boron is a "glass-former", i.e., it extends the crystallinity range of the compositions inside which it is present and lowers the phase transformation temperature (the glass transition temperature, Tg, and the melting temperature, in the case of glasses produced from molten material; and, the sintering temperature in the case of glasses manufactured by means of the sol-gel technique).

When one tries to obtain a boron containing glass by starting from sol-gel technique, unfortunately a problem will be met: the linkages $\equiv$Si—O—B$=$ are extremely prone to attack by —OH groups from water and alcohols, and both these chemical species are inherently present during the first steps of sol preparation.

This lability is due to the electrophilicity of trigonal boron, which is easily attacked by oxygen contained in water and alcohols, and may be represented with the following reaction:

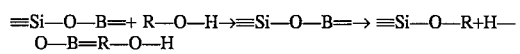

in which R is hydrogen in the case of hydrolysis, and an alkyl radical in the case of alcoholysis (reference is made to "Sol-Gel Science", Brinker and Scherer Editors, Academic Press, 1990).

The above explains the impossibility, well known in the scientific literature, of obtaining bonded boron containing gels by starting from a sol containing either $H_3BO_3$ or $B(OR)_3$ as the precursors.

A solution to this problem is supplied by the Japanese patent No. 1141832 to Shih (EPSON Corporation). In this patent, ammonium or alkali metal borates are used as the reactants in order to introduce boron. In borates, boron is tetra-coordinated and therefore does not display the free site for the nucleophylic attack by water and alcohols. However, this method necessarily introduces useless or even undesirable elements into the composition: for example, alkali metals are known to cause problems during the sintering step, because they induce glass crystallizations.

DETAILED DESCRIPTION OF THE INVENTION

The object of the present invention is providing a method for introducing boron into dry porous gels obtained by means of the sol-gel technique, without any of the drawbacks which affect the prior art, in particular without undesired elements being introduced into the end product.

The method according to the present invention substantially consists in bringing the concerned gel into contact with a boron compound obtained in situ from the mutual reaction of suitable reactants in the gas state: particularly suitable boron compounds are $H_3BO_3$ and $B_2O_3$.

According to a preferred embodiment, the method consists in saturating a chamber containing the previously dried porous gels, with two gas reactants which may react with each other yielding the desired compound; both the reactants and any possible byproducts should be in the gas phase, and the desired boron compound should be solid, because the dry gels are known to be destroyed by the stresses induced by the capillary forces which arise when a liquid is introduced into a dry gel.

Reactions useful for the intended purpose may be the following:

(1) $B_2Cl_4(g) + 3/2\ O_2(g) \rightarrow B_2O_3(s) + 2Cl_2(g)$ (2) $B(OR)_3(g) + O_2(g) \rightarrow B_2O_3(s) + CO_2(g) + H_2O(g)$ (3) $B(OR)_3(g) + 3\ H_2O(g) \rightarrow H_3BO_3(s) + 3\ ROH(g)$ In reaction (1), $B_2Cl_4$, $O_2$ and $Cl_2$ are gases at room temperature, so no special precautions have to be adopted in order to avoid liquids entering the pores of the gel. In the reactions (2) and (3), on the other hand, $B(OCH_3)_3$, $B(OCH_2CH_3)_3$ and $H_2O$ are liquids at room temperature (both boron alkoxides have a boiling temperature of approximately 120° C.); therefore, in the event when in the reaction reactants (or byproducts) are used (or generated) which are liquid at room temperature, the process must be carried out in a thermostatted environment at a higher temperature than the boiling temperature of highest boiling liquid compound.

In the following, two experimental tests are reported in order to illustrate the invention without limiting it.

EXAMPLE 1

A sample of dried gel having the molar composition $SiO_2$ 84%, $TiO_2$ 13%, $AlO_{3/2}$ 3%, was charged to a suitably built glass container, which was then charged to a thermostatted chamber at 150° C. Over the sample, a stream of vapours of $B(OCH_3)_3$ and then of $H_2O$ was caused to flow for 10 minutes, and 10 minutes, respectively. After leaving the system standing for 15 minutes at 150° C., the sample was allowed to cool and was removed from the reactor. The chemical analysis of the resulting sample gave the following result:

| | |
|---|---|
| *$SiO_2$ | 75.0% by mol |
| *$AlO_{3/2}$ | 2.5% by mol |
| *$TiO_2$ | 11.5% by mol |
| *$BO_{3/2}$ | 11.0% by mol |

EXAMPLE 2

On a sample of dried gel having the same composition as the sample used in the preceding example, a stream of $B(OCH_3)_3$ and then a stream of $H_2O$ were caused to flow for 5 minutes, and 5 minutes, respectively, using the same experimental set-up as in Example 1.

The chemical analysis carried out on the resulting sample yielded the following result:

| | |
|---|---|
| *$SiO_2$ | 79.0% by mol |
| *$AlO_{3/2}$ | 2.8% by mol |
| *$TiO_2$ | 12.2% by mol |
| *$BO_{3/2}$ | 6.0% by mol |

On a portion of this sample a dilatometric test was carried out in order to determine the sintering temperature thereof: a sample of clear, completely compacted glass was obtained at 980° C., as compared to the value of about 1300° C., which is the normally required temperature for the $SiO_2$—$TiO_2$—$AlO_{3/2}$ composition cited hereinabove.

I claim:

1. A method for introducing boron into a dry, porous gel obtained by means of the sol-gel technique, which consists of contacting the gel with oxygen and a boron alkoxide so as to produce, in situ, a boron compound and non-boron byproducts, said oxygen, boron alkoxide and non-boron byproducts all being maintained in the gaseous state by performing the contacting at a temperature higher than the boiling temperature of the boron alkoxide or the non-boron byproduct having the highest boiling temperature.

* * * * *